United States Patent [19]

Guiler

[11] 4,326,740

[45] Apr. 27, 1982

[54] SECURITY SEAL

[75] Inventor: Richard S. Guiler, Stewartsville, N.J.

[73] Assignee: E. J. Brooks Company, Newark, N.J.

[21] Appl. No.: 165,700

[22] Filed: Jul. 3, 1980

[51] Int. Cl.³ .................. B65D 55/02; F16B 41/00
[52] U.S. Cl. ........................ 292/307 B; 70/232; 411/371; 411/910
[58] Field of Search .................... 411/1-3, 411/8, 13, 910, 911, 371, 372; 285/80, 81; 70/232; 292/307 B

[56] References Cited

U.S. PATENT DOCUMENTS

| | | | |
|---|---|---|---|
| 1,154,960 | 9/1915 | Baruch | 285/80 X |
| 1,855,931 | 4/1932 | Washburn | 411/910 X |
| 1,870,040 | 8/1932 | Dietze | 292/307 B |
| 2,318,590 | 5/1943 | Boynton | 285/81 |
| 2,322,347 | 6/1943 | Churchman | 70/232 |
| 3,284,121 | 11/1966 | Lyon | 285/80 X |
| 3,298,272 | 1/1967 | Henderson | 411/910 X |
| 3,428,337 | 2/1969 | Read | 285/81 X |
| 4,068,555 | 1/1978 | Volkman | 411/2 |
| 4,137,816 | 2/1979 | Gartner | 411/2 |

Primary Examiner—Robert S. Ward, Jr.
Attorney, Agent, or Firm—Robert E. Ross

[57] ABSTRACT

A seal for a pipe coupling such as is used to connect a gas meter to a gas supply line. The seal is made in two portions, which may be connected by a flexible web, and the portions have integral means for locking together around the nut of a coupling. Each portion has an outer shell with internal protrusions formed on the inner surface thereof. The portions are made of pigmented plastic of a type, such as polypropylene, that forms a white blush on the surface when permanently deformed. Hence when an attempt is made to remove the seal by a wrench or the like, the internal protrusions are forced against the nut, forming white blushes on the outer surface opposite the position of the ribs, giving visual evidence of tampering.

6 Claims, 7 Drawing Figures

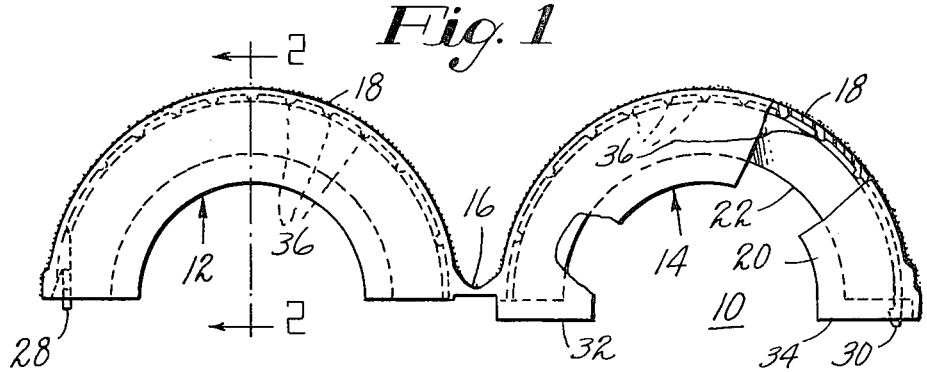
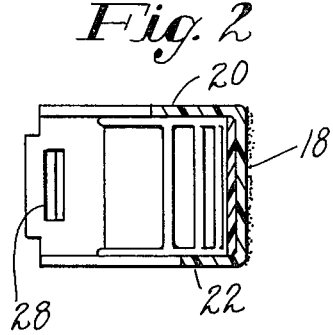
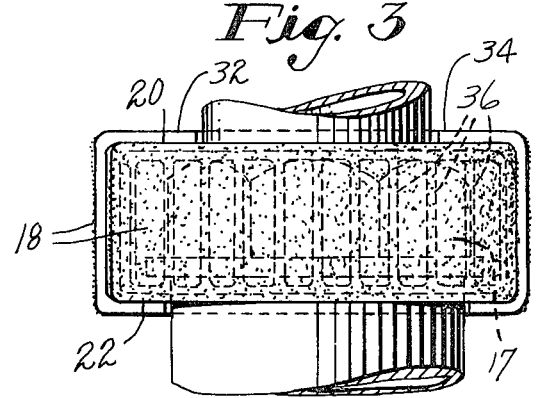
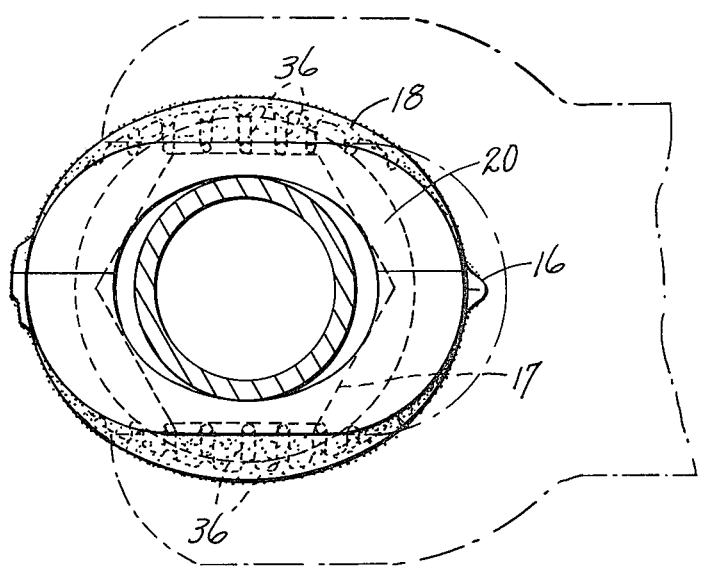

SECURITY SEAL

BACKGROUND OF THE INVENTION

In the gas utility industry, it is often required that provision be made to detect attempts to tamper with gas meters, said attempts being either for the purpose of removing the meter to remove a gas blocking plate or to enable the use of gas directly from the supply pipe. For this purpose it has been common to enclose the nut which couples the meter pipe to the supply pipe with a seal in the form of two halves being either fastened together with a lead and wire seal, or being provided with integral means for snapping together in non-revovable engagement.

However the use of such devices has been limited by their expense, and by the fact that it is often possible to remove such seals and replace them without evidence of tampering.

SUMMARY OF THE INVENTION

A seal for a gas meter coupling nut is provided, which is formed of injection molded plastic, and comprises an outer shell which is generally U-shaped in cross-section, so as to enable it to enclose a coupling nut. The shell is provided with internal protrusions such as ribs which are integral with the inside surface of the shell, said ribs projecting inwardly. The shell may be formed in two halves connected by a flexible web, or may be formed of two separate identical halves. In either case, integrally molded fastening means are provided within the halves to allow said halves to snap together in locking engagement.

The plastic used in manufacturing the seal is a pigmented type such as polyproplyene, which has the characteristic of forming a white blush on the surface when permanently deformed, so that when an attempt is made to remove the coupling nut by the application of a wrench or other gripping tool, the gripping force causes the internal ribs to bear against the coupling nut. The pressure applied by the gripping device causes a white blush to appear on the outer surface, providing visual evidence of the attempt to remove the seal.

BRIEF DESCRIPTION OF THE DRAWING FIGURES

FIG. 1 is a top plan view of one form of seal embodying the features of the invention;

FIG. 2 is a view in section taken on line 2—2 of FIG. 1;

FIG. 3 is a view in side elevation of the seal of FIG. 1 assembled into a coupling nut;

FIG. 4 is a top plan view of the seal of FIG. 2 in which a wrench is being used in an attempt to remove the coupling nut;

DESCRIPTION OF THE ILLUSTRATED EMBODIMENTS

Figure 5:
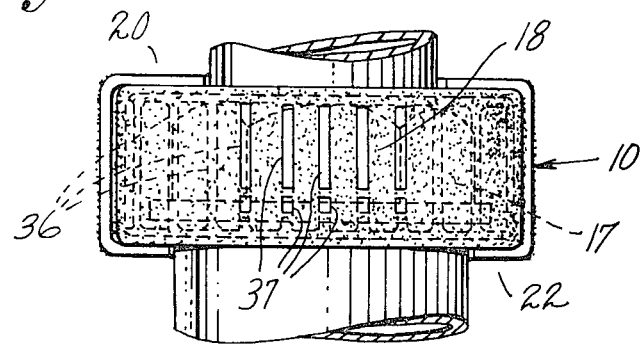
FIG. 5 is a view in side elevation of the assembly of FIG. 3 after the use of a wrench on the assembly.

Referring to FIGS. 1-5 of the drawing, there is illustrated a coupling nut seal 10 which is formed of two housing portions 12 and 14, connected by a flexible web 16 serving as a hinge. Each housing portion is semi-circular in plan shape, with a cross section which is generally U-shaped, formed by a peripheral wall 18 and upper and lower surfaces 20 and 22 extending radially inwardly from the peripheral wall, forming central apertures 24 and 26 when the portions are pivoted together about the web 16.

The demensions of the device are such that when it is assembled onto a coupling nut 17 with which it is designed to be used, the periphery 28 encloses the periphery of the nut and the upper and lower surfaces 20 and 22 cover the upper and lower surfaces of the nut.

In the embodiment of FIGS. 1-5, the outermost ends of the housing portions 12 and 14 have latch members 28 and 30 shaped and positioned for locking engagement with each other when the housing portions are pivoted together around the nut 18. To prevent access to the latching members after they are engaged, the ends of housing portion 14 have extended and enlarged portions 32 and 34 which are dimensioned to enclose the corresponding ends of the housing portion 12 when the portions are pivoted together. (See FIGS. 3 and 4).

Integrally formed on the inside surface of the outer periphery 18 are ribs 36 which extend substantially the entire width thereof and are uniformly spaced about the circumference.

The seal is preferably formed of injection molded pigmented plastic of a type, such as polyproplyene, which has the characteristic of forming a white blush on the surface when it is physically deformed.

When an attempt is made to unscrew the coupling nut 17 by the use of a wrench or other tool with gripping jaws, to cause rotation of the nut the jaws thereof must compress the plastic seal against the outer surface of the nut with enough force to cause the ribs 36 to bear against said surface. High compressive forces are thereby created on the outside surface of the periphery 18 opposite the position of the ribs, which cause permanent deformation of said surface along vertical lines corresponding to the position of said ribs, thereby giving white blush marks 37, giving visual evidence of tempering. Hence whether the seal is removed and replaced by unauthorized persons, or whether merely an attempt at removal is made, the visual evidence of tampering will alert utility personnel to the fact, and the plastic seal can be replaced with a more expensive steel enclosure for the coupling nut.

Another method that might be used to defeat the purpose of the seal, in the modification of FIGS. 1-5, would be to cut the seal apart with a sharp knife, remove the gas blocking plate from inside the pipe, and reassemble the seal either by fusing the cut ends together or by joining the curt ends together with clear tape. To make tampering in this manner apparent by a visual inspection, the exterior surface of the seal may be provided with a textured surface, which would be destroyed if the cut ends were fused together, or would show visible air pockets if the surface were joined by a clear tape.

Figure 6:
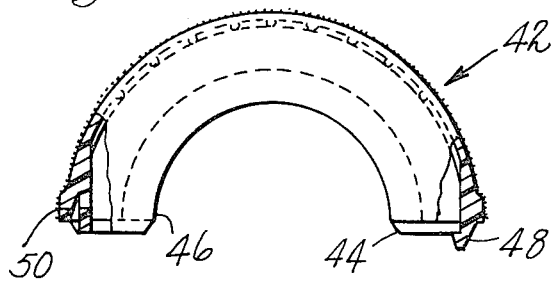
FIG. 6 is a plan view of a modified form of seal portion.
Figure 7:
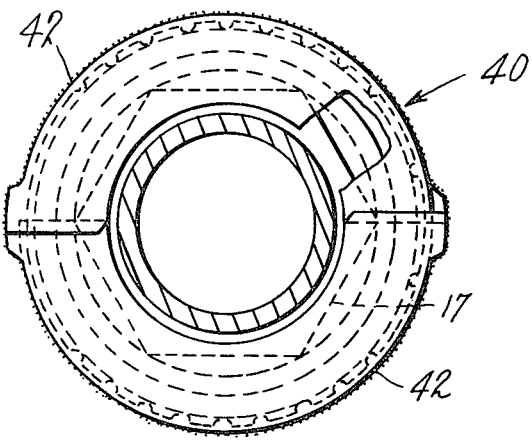
FIG. 7 is a plan view of two seal portions as illustrated in FIG. 6 assembled onto a coupling nut.

Referring to FIGS. 6 and 7, there is illustrated a modified form of seal 40 embodying the features of the invention. The seal 40, shown assembled in FIG. 6, is formed of two identical housing portions 42, as shown in FIG. 6. Each housing portion has a male end 44 and a female end 46. The male end 44 is received within the female end 46 of another housing portion, and the female end 46 is designed to receive the male end of the other housing portion, so that when so assembled, the two identical housing portions form a seal that encloses the coupling nut in the manner described in connection with the seal 10 of FIGS. 1-5.

For this purpose the female end 46 is enlarged so that it has an internal diameter equal to or slightly greater than the outside diameter of the male end 44. The male end and the female end are provided with cooperating snap fastener portions 48 and 50 which are designed for locking engagement when the two identical portions are assembled around a coupling nut.

The other portions of the seal structure may be identical to that of the seal 10 previously described, including internal ribs, the composition of the material of which it is formed, and the texturing of the surface.

Although in the illustrated embodiment the protrusions are formed on the internal surface of the peripheral wall are in the form of vertical ribs, the protrusions may have other configurations such as horizontal ribs in individual bosses.

Since certain obvious changes may be made in the herein illustrated embodiments of the invention without departing from the scope thereof, it is intended that all matter contained herein be interpreted in an illustrative and not in a limiting sense.

I claim:

1. A seal for a pipe coupling nut or the like, comprising a housing formed in two portions, said portions being shaped to closely enclose the nut when assembled with each other and having means enabling the portions to be non-removably fastened together, said housing portions being formed of a pigmented plastic of a type that forms a white blush on the surface when permanently deformed, said housing portions having a plurality of inward protrusions on the innersurface positioned to be compressed against the nut when the seal is gripped by a tool that applies a compressive force thereto.

2. A seal as set out in claim 1 in which said housing portions are formed as a unitary body joined at adjacent ends by a flexible web and having cooperating means at the other ends for locking engagement with each other, housing ends that are adjacent when the housing portions are assembled comprising one end having an enlarged extreme end portion that receives and surrounds the other end portion when the portions are assembled.

3. A seal as set out in claim 2 in which the external surface of the housing portions is textured.

4. A seal for a pipe coupling nut or the like, comprising a housing comprising two portions formed of pigmented plastic of the type that forms a white blush on the surface when permanently deformed, each portion being generally semi-circular in plan shape and having a peripheral wall dimensioned to closely surround the outer periphery of the nut and upper and lower surfaces which extend radially inwardly from the wall and are spaced apart an appropriate distance to enclose the upper and lower surfaces of the nut, said peripheral wall having protrusions formed on the inner surface, whereby when a gripping tool is applied to the seal to remove the nut, white blushes are formed on the outer surface of the wall opposite the position of protrusions.

5. A seal as set out in claim 4 in which said housing portions are joined at one set of ends by a flexible web and the other set of ends have cooperating latch means shaped and arranged to lock said ends together when the housing portions are pivoted together about the web, each set of housing ends having one end with an enlarged extreme end portion dimensioned to closely receive the other end of said set.

6. A seal as set out in claim 4 in which said housing portions are of identical size and shape, each housing portion having a first end with an enlarged portion and a second end, so dimensioned that the first end of one housing portion can receive and enclose the second end of another housing portion and the second end of said one housing portion can be received in the first end of said other housing portion, and latch means associated with each end of the housing portion capable of non-removable locking engagement with the opposite ends of said other housing portion.

* * * * *